United States Patent
Ono

(10) Patent No.: US 11,007,691 B2
(45) Date of Patent: May 18, 2021

(54) EXHAUST UNIT FOR INJECTION MOLDING MACHINE

(71) Applicant: FANUC CORPORATION, Yamanashi (JP)

(72) Inventor: Mitsuhiro Ono, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/687,500

(22) Filed: Nov. 18, 2019

(65) Prior Publication Data

US 2020/0198199 A1 Jun. 25, 2020

(30) Foreign Application Priority Data

Dec. 21, 2018 (JP) .............................. JP2018-239774

(51) Int. Cl.
 *B29C 45/17* (2006.01)
 *B29C 45/74* (2006.01)

(52) U.S. Cl.
 CPC .......... *B29C 45/1753* (2013.01); *B29C 45/74* (2013.01)

(58) Field of Classification Search
 CPC . B29C 45/1753; B29C 45/1755; B29C 45/74; B29C 2045/1797; B29C 45/1701; B08B 15/02
 See application file for complete search history.

(56) References Cited

U.S. PATENT DOCUMENTS

| | | | | |
|---|---|---|---|---|
| 3,635,628 A | * | 1/1972 | Cook, Jr. | ............ B29C 45/1755 425/151 |
| 3,728,057 A | * | 4/1973 | Grundmann | ............ B29C 45/84 425/136 |
| 4,382,763 A | * | 5/1983 | Hehl | ........................ B29C 45/84 425/153 |
| 4,680,002 A | * | 7/1987 | Hehl | ........................ B29C 45/07 425/186 |
| 5,460,505 A | * | 10/1995 | Ito | ........................... B29C 45/17 425/151 |
| 5,961,898 A | * | 10/1999 | Higashida | ............ B29C 45/1753 264/328.1 |

(Continued)

FOREIGN PATENT DOCUMENTS

| | | |
|---|---|---|
| JP | S58-067429 A | 4/1983 |
| JP | S60-245524 A | 12/1985 |

(Continued)

OTHER PUBLICATIONS

An Office Action; "Notice of Reasons for Refusal", mailed by the Japanese Patent Office dated Feb. 16, 2021, which corresponds to Japanese Patent Application No. 2018-239774 and is related to U.S. Appl. No. 16/687,800; with English language translation.

*Primary Examiner* — Xiao S Zhao
*Assistant Examiner* — Emmanuel S Luk
(74) *Attorney, Agent, or Firm* — Studebaker & Brackett PC

(57) ABSTRACT

An exhaust unit for injection molding machine includes a purge cover having a nozzle through-hole allowing a nozzle of a cylinder of an injection molding machine to pierce through, an exhaust passage extending higher than the cylinder in the upward direction, and an exhaust port communicating with the exhaust passage, and a stationary platen connected to the exhaust port of the purge cover.

4 Claims, 6 Drawing Sheets

(56) References Cited

U.S. PATENT DOCUMENTS

| | | | | |
|---|---|---|---|---|
| 6,655,947 B1* | 12/2003 | Hehl | ............... | B29C 45/17 |
| | | | | 425/151 |
| 6,939,124 B2* | 9/2005 | Koch | ............... | B29C 45/17 |
| | | | | 425/107 |
| 8,709,311 B2* | 4/2014 | Aebi | ............... | B29C 45/1701 |
| | | | | 264/37.14 |
| 9,409,334 B2* | 8/2016 | Tanemura | ............ | B29C 45/1755 |
| 9,827,702 B2* | 11/2017 | Ohshiro | ............ | B29C 45/1777 |
| 10,647,043 B2* | 5/2020 | Issel | ............... | B29C 45/84 |
| 2003/0215540 A1* | 11/2003 | Asai | ............... | B29C 45/73 |
| | | | | 425/547 |
| 2005/0100630 A1* | 5/2005 | Yoshioka | ............ | B29C 45/1744 |
| | | | | 425/574 |
| 2008/0318074 A1* | 12/2008 | Suga | ............... | B29C 45/14688 |
| | | | | 428/483 |
| 2012/0175815 A1* | 7/2012 | Aebi | ............... | B29C 45/1701 |
| | | | | 264/328.1 |
| 2016/0016344 A1* | 1/2016 | Tanemura | ............ | B29C 45/1755 |
| | | | | 425/542 |
| 2016/0114510 A1* | 4/2016 | Ohshiro | ............ | B29C 45/84 |
| | | | | 425/589 |
| 2017/0291341 A1* | 10/2017 | Einfalt | ............ | B29C 45/176 |
| 2020/0189162 A1* | 6/2020 | Ono | ............... | B29C 45/1755 |

FOREIGN PATENT DOCUMENTS

| | | |
|---|---|---|
| JP | H05-269797 A | 10/1993 |
| JP | H10-100215 A | 4/1998 |
| JP | 2002-301557 A | 10/2002 |
| JP | 2013-226816 A | 11/2013 |

* cited by examiner

EXHAUST UNIT FOR INJECTION MOLDING MACHINE

This application is based on and claims the benefit of priority from Japanese Patent Application No. 2018-239774, filed on 21 Dec. 2018, the content of which is incorporated herein by reference.

BACKGROUND OF THE INVENTION

Field of the Invention

The present invention relates to an exhaust unit for injection molding machine.

Related Art

Conventionally, an injection molding machine is equipped with various covers which cover a cylinder, a nozzle and the like. Among them, a purge cover is configured in the periphery of a nozzle, so as to suppress the scattering of molding material during a purge operation (refer to, for example, Patent Documents 1, 2).

Patent Document 1: Japanese Unexamined Patent Application, Publication No. 2013226816
Patent Document 2: Japanese Unexamined Patent Application, Publication No. 2002-301557

SUMMARY OF THE INVENTION

In an injection molding machine, when a cylinder, a nozzle or the like reaches a high temperature, the heated air stays inside the purge cover, and thus the surface of the purge cover reaches a high temperature. Therefore, a purge cover for injection molding machine should lower the temperature of the surface thereof, while suppressing the scattering of molding material.

An object of the present invention is to provide an exhaust unit for injection molding machine capable of lowering the temperature of the surface thereof, while suppressing the scattering of molding material.

(1) The present invention relates to an exhaust unit for injection molding machine (for example, an exhaust unit 5 for injection molding machine to be described below). The exhaust unit for injection molding machine includes a purge cover (for example, a purge cover 20 to be described below) having a nozzle through-hole (for example, a nozzle through-hole 215 to be described below) allowing a nozzle of a cylinder of an injection molding machine to pierce through, an exhaust passage (for example, a second cover 22 to be described below) extending higher than the cylinder in the upward direction, and an exhaust port (for example, an exhaust port 234 to be described below) communicating with the exhaust passage, and a stationary platen (for example, a stationary platen 2 to be described below) connected to the exhaust port of the purge cover.

(2) In the exhaust unit for injection molding machine according to (1), the exhaust passage of the purge cover may include a roof part (for example, a second cover 22 to be described below) configured to guide the air discharged from the side of the cylinder to the side of the stationary platen.

(3) in the exhaust unit for injection molding machine according to (2), the roof part may have a tilted plane (for example, a tilted plate 221 to be described below) tilted from the side of the cylinder upward while approaching the side of the stationary platen.

(4) In the exhaust unit for injection molding machine according to (2) or (3), the roof part may have a dual structure including an outer cover (for example, an outer cover 220 to be described below) and an inner cover (for example, an inner cover 230 to be described below) superposed on each other, and the outer cover has a heat radiation structure, and the inner cover does not have a heat radiation structure.

(5) In the exhaust unit for injection molding machine according to any one of (1) to (4), the stationary platen may have a discharge hole (for example, a discharge hole 2b to be described below) allowing to discharge, to the outside through the stationary platen, the air discharged from the connected exhaust port of the purge cover.

The exhaust unit for injection molding machine according to the present invention is capable of lowering the temperature of the surface thereof, while suppressing the scattering of molding material.

DETAILED DESCRIPTION OF THE INVENTION

Figure 1:
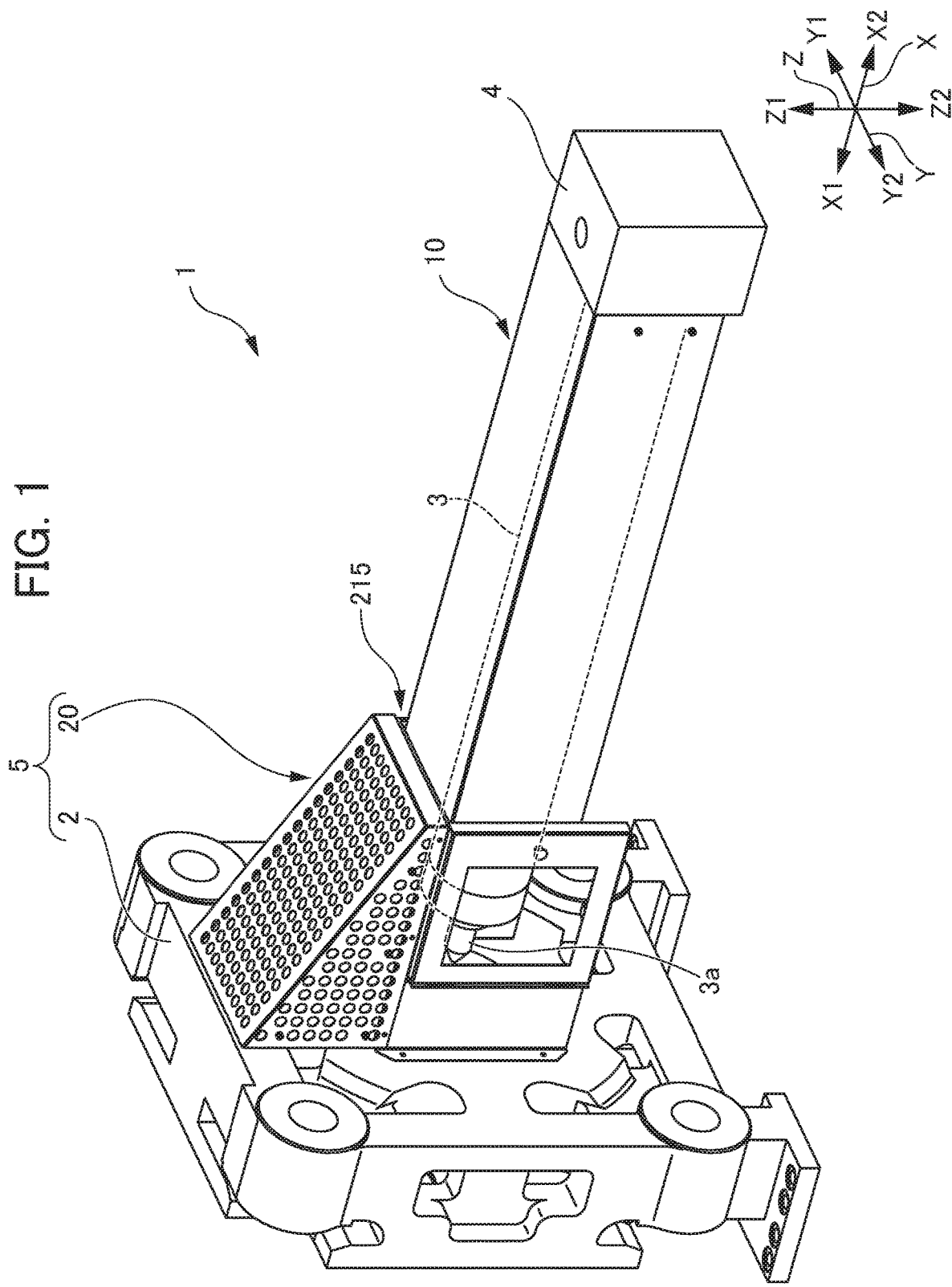
FIG. 1 is an oblique view partially showing an injection molding machine 1 equipped with a cylinder cover 10 and an exhaust unit 5 for injection molding machine according to the present embodiment.

Some embodiments according to the present invention will be described below. All of the drawings attached to the present specification are schematic diagrams. Taking ease of understanding into consideration, the shape, scale, length/width ratio, and the like of each part are changed or exaggerated as compared to the actual ones. In the drawings, hatching indicating a cross section of a member will be omitted as appropriate. In the present specification and the like, terms for shapes and geometric conditions, and terms specifying the extent of these, for example, "parallel," "orthogonal" and "direction," include not only the exact meaning of the terms, but also ranges taken as substantially parallel and substantially orthogonal, and a range taken as substantially a targeted direction.

In the present specification and the like, an X direction corresponds to the direction which is parallel to the longitudinal direction of a cylinder 3 of the injection molding machine 1 and which is the front/back direction along the advancing/retreating direction of the cylinder 3. A Y direction corresponds to the left/right direction orthogonal to the X direction in a plan view. A Z direction corresponds to the direction which is orthogonal to the X-Y plane and which is the up/down direction (vertical direction). With regard to the front/back direction (X direction), an X1 direction corresponds to the front direction in which the cylinder 3 approaches the stationary platen 2, and an X2 direction corresponds to the back direction in which the cylinder 3 moves away from the stationary platen 2. With regard to the left/right direction (Y direction), a Y1 direction corresponds to the right direction in the drawings, and a Y2 direction corresponds to the left direction. With regard to the up/down direction (Z direction), a Z1 direction corresponds to the upward direction in the drawings, and a Z2 direction corresponds to the downward direction. It is noted that, in the present specification, "(something) direction" is also referred to as "(something) side" or "the side of (something)" as appropriate.

Figure 2:
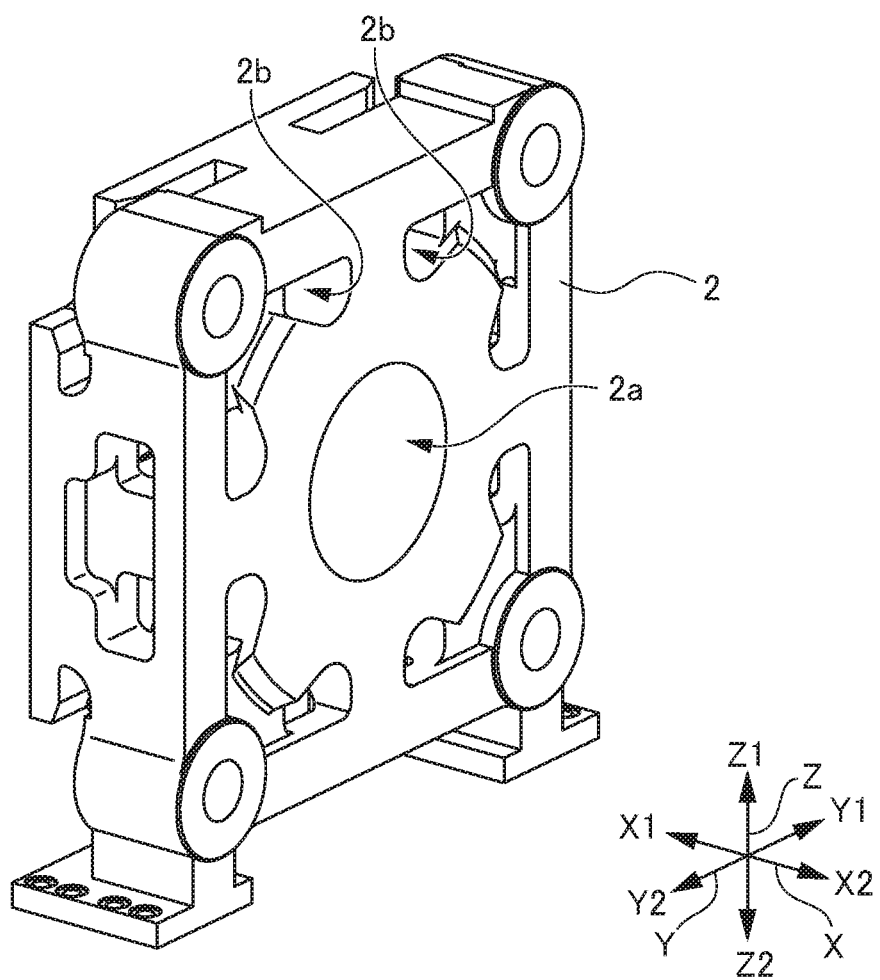
FIG. 2 is an oblique view showing a stationary platen 2 viewed from an X2 side.
Figure 3:
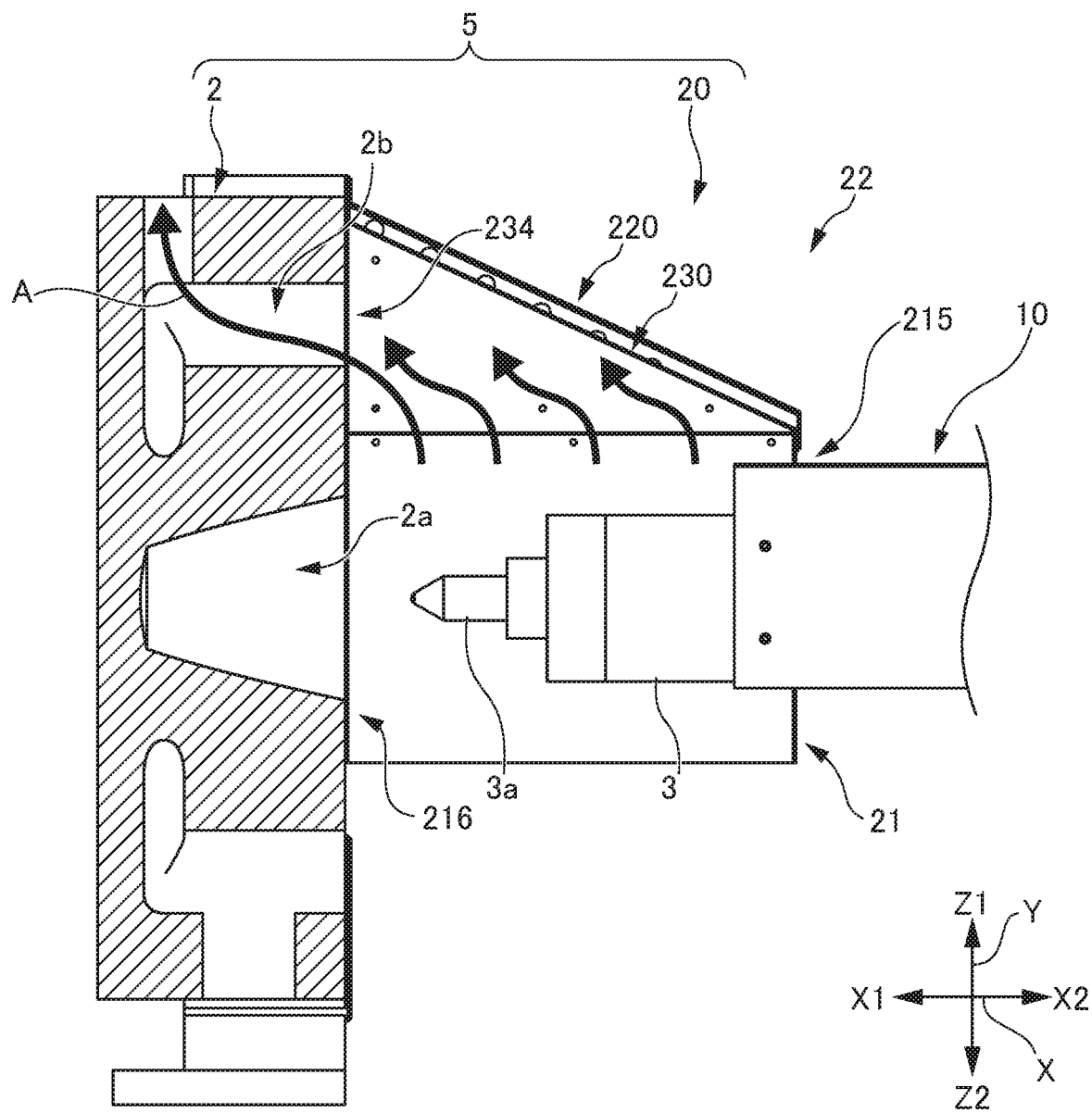
FIG. 3 is a cross sectional view showing the exhaust unit 5 for injection molding machine.
Figure 4A:
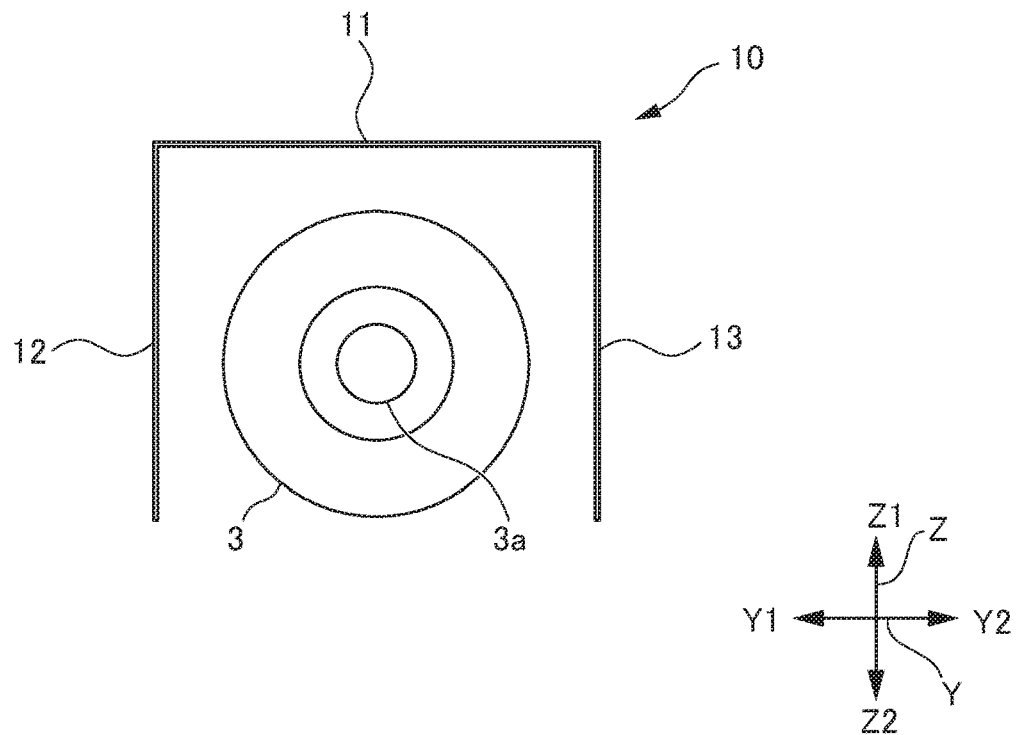
FIG. 4A is a cross sectional view showing a first configuration of the cylinder cover 10.
Figure 4B:
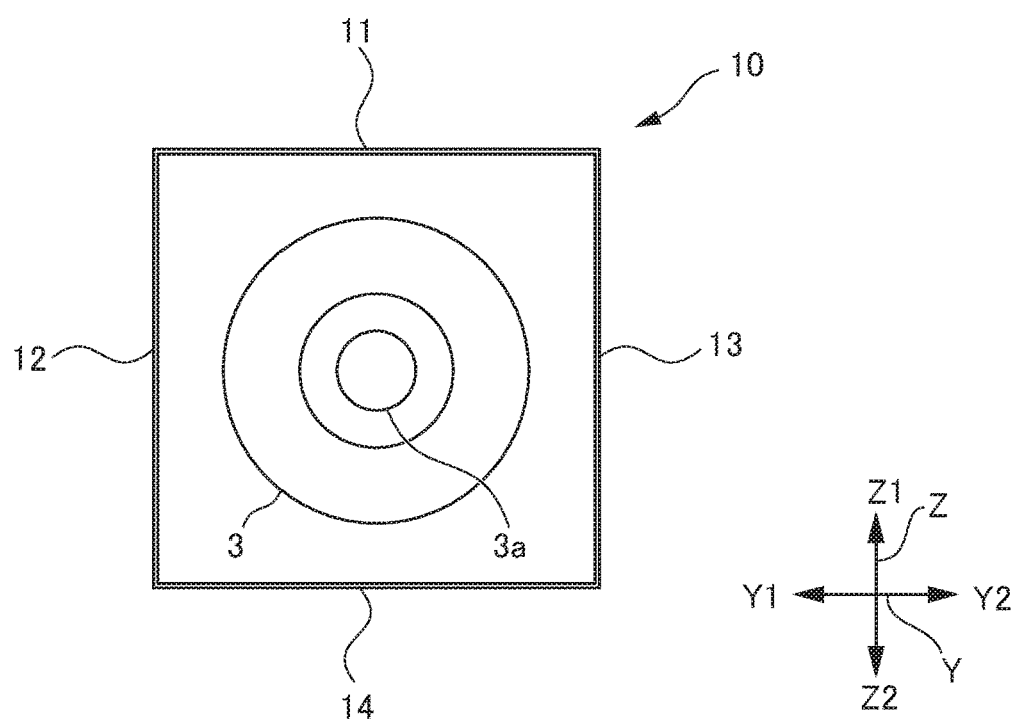
FIG. 4B is a cross sectional view showing a second configuration of the cylinder cover 10.
Figure 5:
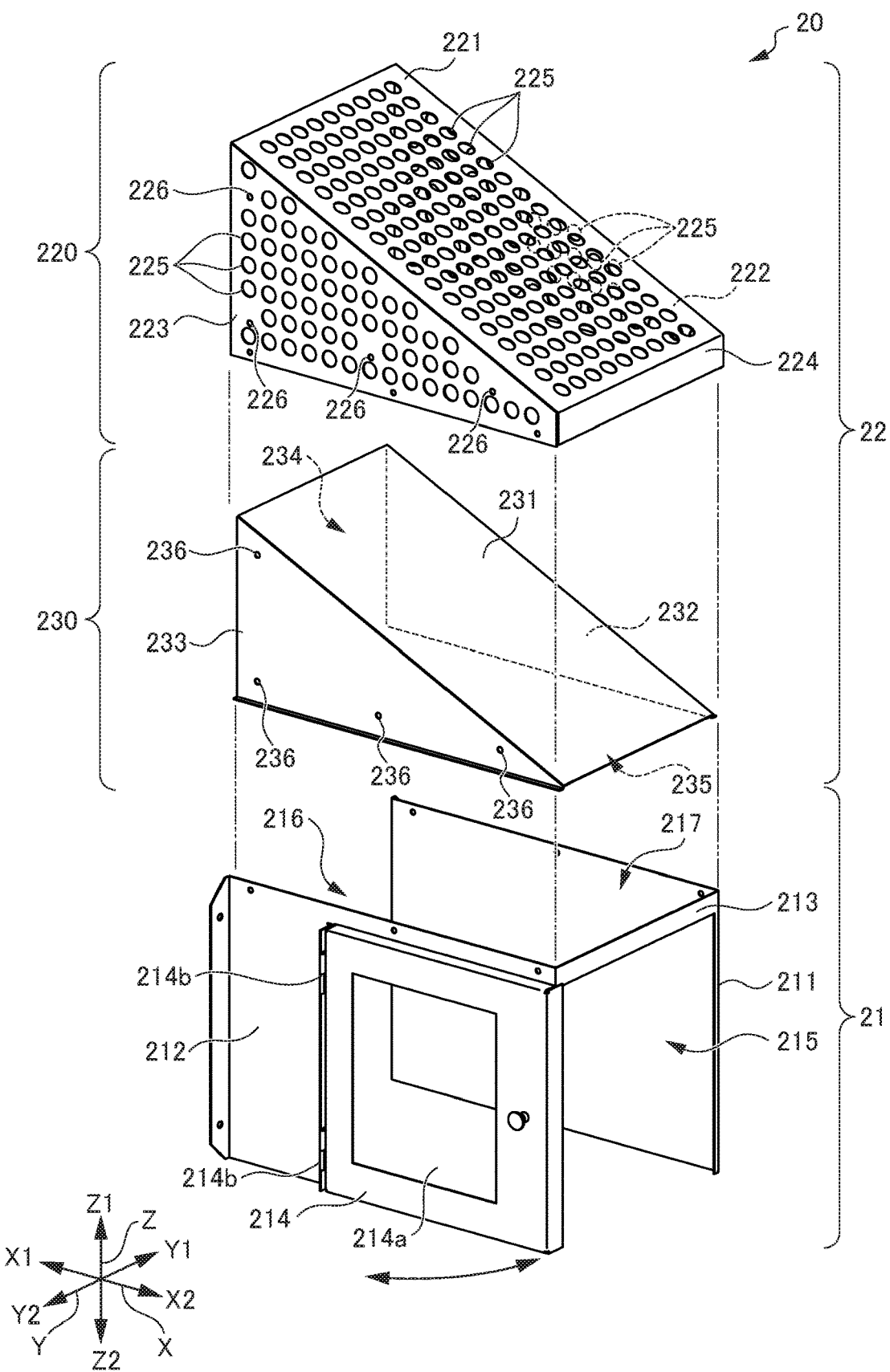
FIG. 5 is an exploded oblique view of a purge cover 20.
Figure 6:
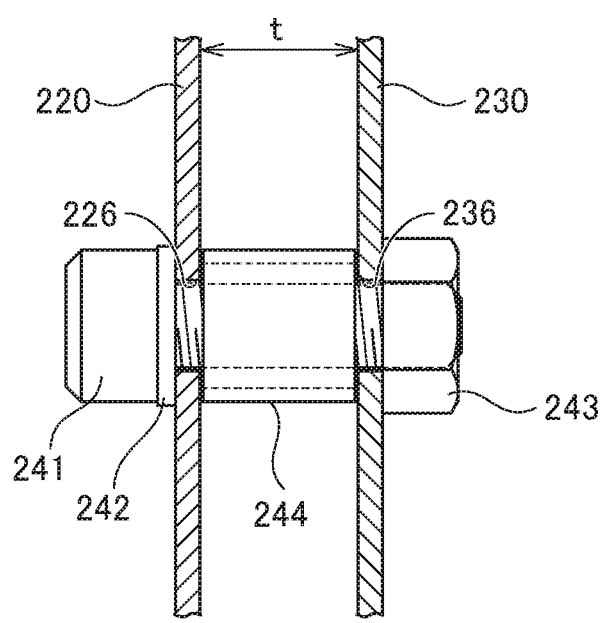
FIG. 6 is an exploded sectional view of the purge cover 20, showing the structure connecting an outer cover 220 and an inner cover 230.

FIG. 1 is an oblique view partially showing the injection molding machine 1 equipped with the cylinder cover 10 and the exhaust unit 5 for injection molding machine according to the present embodiment. FIG. 2 is an oblique view showing the stationary platen 2 viewed from the X2 side. FIG. 3 is a cross sectional view showing the exhaust unit 5 for injection molding machine. FIG. 4A is a cross sectional view showing the first configuration of the cylinder cover 10. FIG. 4B is a cross sectional view showing the second configuration of the cylinder cover 10. Each of FIG. 4A and FIG. 4B shows a cross section parallel to the Y-Z plane, of the cylinder cover 10 viewed from the side of the stationary platen 2. FIG. 5 is an exploded oblique view of the purge cover 20. FIG. 6 is an exploded sectional view of the purge cover 20, showing the structure connecting the outer cover 220 and the inner cover 230.

As shown in FIG. 1, the injection molding machine 1 is equipped with the cylinder cover 10 and the purge cover 20. FIG. 1 shows the stationary platen 2, the cylinder 3 and a water-cooling jacket 4, as parts necessary for the description of the present embodiment out of the parts included in the injection molding machine 1. The stationary platen 2 and the purge cover 20 shown in FIG. 1 are included in the exhaust unit 5 for injection molding machine according to the present embodiment. That is, the stationary platen 2 is a structure supporting a stationary mold (to be described below), and partially constitutes the exhaust unit 5 for injection molding machine.

The stationary platen 2 is a structure supporting a stationary mold (not shown). As shown in FIG. 2 and FIG. 3, the stationary platen 2 includes an insertion port 2a into which a nozzle 3a (to be described below) of the cylinder 3 is to be inserted. As shown in FIG. 2, the stationary platen 2 includes two discharge holes 2b in the back side (X2 side) thereof. As shown in FIG. 3, each of the discharge holes 2b is the hole which communicates from the back side (X2 side) to the upward side (Z1 side) of the stationary platen 2. As shown in FIG. 3, the air discharged from an exhaust port 234 (to be described below) of the purge cover 20 is partially taken (indicated by an arrow denoted by A in FIG. 3) from the discharge holes 2b, passes through the inside of the stationary platen 2, and is discharged to the upward side (Z1 side). It is noted that the configurations of the discharge holes 2b in the stationary platen 2 enable partial discharge of the air, and achieves the stationary platen 2 that is lighter in weight.

A movable platen (not shown) is disposed on the X1 side of the stationary platen 2. The movable platen is a structure supporting a movable mold (not shown). A mold is configured with the stationary mold supported by the stationary platen 2 and the movable mold supported by the movable platen. The movable platen is supported movably in the X (X1-X2) direction by a mold driving device (not shown). The movable platen is moved in the X2 direction and brought into intimate contact with the stationary platen 2 and thereafter the mold is closed mechanically, whereby a cavity is formed inside the mold. A molding is formed by filling the cavity with the molding material injected through the cylinder 3.

The cylinder 3 feeds a molten molding material (resin) into the mold. The cylinder 3 is driven by an injection device (not shown) to advance and retreat along the X direction. The cylinder 3 is driven to advance toward the stationary platen 2 in FIG. 1, and the screw (not shown) disposed inside the cylinder 3 is rotated under the state where the nozzle 3a (to be described below) is inserted in the insertion port 2a of the stationary platen 2 (refer to FIG. 3), whereby the inside of the mold is filled with a predetermined amount of the molding material. As shown in FIG. 3, the cylinder 3 has, at the tip in the X1 side thereof, the nozzle 3a allowing to feed the molten molding material into the mold. A heater (not shown) configured to melt the molding material filled in the cylinder 3 is disposed at the outer peripheral side of the cylinder 3.

The water-cooling jacket 4 is configured to cool the base side (X2 side) portion of the cylinder 3. In the water-cooling jacket 4, water for cooling the cylinder 3 is circulated. An injection device (not shown) is disposed on the X2 side of the water-cooling jacket 4. It is noted that the above-described injection molding machine 1 and the cylinder cover 10 and the purge cover 20 to be described below are installed on a base stand (not shown).

The cylinder cover 10 is a protective member which covers the periphery of the cylinder 3. The cylinder cover 10 disposed in the periphery of the cylinder 3 enables the suppression of contact with the cylinder 3 heated to a high temperature by the heater. The edge part of the cylinder cover 10 on the X1 side is inserted in a nozzle through-hole 215 (to be described below) of the purge cover 20. The edge part of the cylinder cover 10 on the X2 side is connected to the water-cooling jacket 4. It is noted that the edge part of the cylinder cover 10 on the X2 side may be connected to, for example, the cylinder 3, not being connected to the water-cooling jacket 4.

As shown in FIG. 4A, the cylinder cover 10 having the first configuration is configured with an upper plate 11, a right-side plate 12 and a left-side plate 13. The cylinder cover 10 having the first configuration has no lower plate (on the Z2 side), and thus has an inverted concave shape in a cross-sectional view. As shown in FIG. 4B, the cylinder cover 10 having the second configuration is formed in a substantially tubular shape configured with the upper plate 11, the right-side plate 12, the left-side plate 13 and a bottom plate 14. The configuration of the cylinder cover 10 may be either one of the first and second configurations described above. It is noted that the cylinder cover 10 may have any configuration as long as the configuration has a function equivalent to those of the first and second configurations.

The purge cover 20 is the protective member which covers the periphery of the nozzle 3a (the cylinder 3) on the X1 side of the cylinder cover 10. The purge cover 20 disposed in the periphery of the nozzle 3a enables suppression of the scattering of the molding material during the purge operation. The purge cover 20 according to the present embodiment guides the air heated in the periphery of the cylinder 3 to the side of the stationary platen 2 as will be described below, and thus the air is suppressed from staying inside the purge cover 20.

As shown in FIG. 5, the purge cover 20 includes a first cover 21 and a second cover 22. The first cover 2 is the member disposed at the lower side (Z2 side) in the purge cover 20. As shown in FIG. 5, the first cover 21 includes a right-side plate 211, a left-side plate 212, a connecting plate 213, and a door with window 214. The right-side plate 211 is the plate-like member disposed at the right side (Y1 side) of the first cover 21. The left-side plate 212 is the plate-like member disposed at the left side (Y2 side) of the first cover 21. The right-side plate 211 and the left-side plate 212 are connected by the connecting plate 213 at the upper part of the back side (X2 side).

The first cover 21 includes the nozzle through-hole 215 in the back side (X2 side) thereof. The nozzle through-hole 215 is an opening into which the nozzle 3a (refer to FIG. 3) of the cylinder 3 is to be inserted. The first cover 21 includes a connection frame 216 in the front side (X1 side) thereof. The connection frame 216 is a portion to be connected to the stationary platen 2 (refer to FIG. 3), in the first cover 21. The first cover 21 includes a communication port 217 in the upper side (Z1 side). The communication port 217 is an opening which communicates with a communication port 235 (to be described below) of the second cover 22.

The door with window 214, which is the door disposed on the left-side plate 212, is configured to be supported openably and closably in the directions of the arrows by a hinge part 214b. The door with window 214 includes a transparent window 214a. An operator is able to visually check the periphery of the nozzle 3a (refer to FIG. 3) through the window 214a under the state where the door with window 214 is closed. It is noted that the door with window 214 may be disposed on the right-side plate 211, or may be disposed both on the right-side plate 211 and the left-side plate 212.

As shown in FIG. 3, the connection frame 216 in the X1 side of the first cover 21 is attached to the X2 side face of the stationary platen 2. Since the first cover 21 has the connection frame 216 with an opening in the X1 side, the cylinder 3 is made to advance and retreat along the X direction under the state where the first cover 21 is attached to the stationary platen 2, whereby the nozzle 3a is allowed to be inserted into or retreated from the insertion port 2a of the stationary platen 2.

The second cover 22 is the exhaust passage which extends higher than the cylinder 3 in the upward direction (Z1 direction) from the first cover 21. The second cover 22 functions as the roof part which guides the heated air discharged from the side of the cylinder 3 to the side of the stationary platen 2. As shown in FIG. 5, the second cover 22 includes the outer cover 220 and the inner cover 230. The second cover 22 according to the present embodiment is configured as the dual structured cover in which the outer cover 220 and the inner cover 230 are superposed on each other.

The outer cover 220 is the member disposed at the upper side (Z1 side) of the second cover 22. As shown in FIG. 5, the outer cover 220 includes a tilted plate 221, a right-side plate 222, a left-side plate 223 and a back plate 224. The tilted plate 221 is a plate-like member disposed at the upper side (Z1 side) of the outer cover 220. The tilted plate 221 corresponds to the tilted plane which is tilted from the side of the cylinder 3 upward (toward the Z1 direction) while approaching the side of the stationary platen 2, in the outer cover 220. As described above, the second cover 22 serving as a roof part has the tilted plane which is tilted from the side of the cylinder 3 upward while approaching the side of the stationary platen 2.

The right-side plate 222 is a plate-like member disposed at the right side (Y1 side) of the outer cover 220. The left-side plate 223 is a plate-like member disposed at the left side (Y2 side) of the outer cover 220. The back plate 224 is a plate-like member disposed at the back side (X2 side) of the outer cover 220. The outer cover 220 is configured to have, in the side view viewed from the left/right direction (Y direction), a substantially right-angled triangular shape in which the tilted plate 221 corresponding to the tilted plane is tilted from the back side (X2 side) upward (toward the Z1 direction) while approaching the front side (X1 side).

As shown in FIG. 5, each of the tilted plate 221, the right-side plate 222 and the left-side plate 223 of the outer cover 220 has a plurality of circular vents 225. Each of the vents 225 is an opening which discharged the air heated by the surface of the inner cover 230 (to be described below) to the outside. That is, the outer cover 220 has the plurality of vents 225 as a heat radiation structure. The outer cover 220 has a function of suppressing contact with the inner cover 230 (to be described below) which reaches a higher temperature as compared with the surface of the outer cover 220.

Each of the right-side plate 222 and the left-side plate 223 of the outer cover 220 has first connection holes 226 at four positions (FIG. 5 shows the first connection holes 226 only of the left-side plate 223). Each of the first connection holes 226 is an opening into which a bolt 241 (to be described below) is to be inserted.

The inner cover 230 is a member disposed inside the outer cover 220 of the second cover 22. The inner cover 230 includes a tilted plate 231, a right-side plate 232 and a left-side plate 233. The tilted plate 231 is a plate-like member disposed at the upper side (Z1 side) of the inner cover 230. The tilted plate 231 corresponds to a tilted plane which is tilted from the side of the cylinder 3 upward (toward the Z1 direction) while approaching the side of the stationary platen 2, in the inner cover 230. The right-side plate 232 is the plate-like member disposed at the right side (Y1 side) of the inner cover 230. The left-side plate 233 is the plate-like member disposed at the left side (Y2 side) of the inner cover 230.

The inner cover 230 is configured to have, in the side view viewed from the left right direction (Y direction), the substantially right-angled triangular shape in which the tilted plate 231 corresponding to the tilted plane is tilted from the back side side) upward (toward the Z1 direction) while approaching the front side (X1 side). As shown in FIG. 5, the tilted plate 231, the right-side plate 232 and the left-side plate 233 of the inner cover 230 do not have a heat radiation structure, such as a vent. This is because the inner cover 230 is configured to guide the air heated in the periphery of the cylinder 3 to the side of the stationary platen 2.

The inner cover 230 includes the exhaust port 234 in the front side (X1 side) thereof. The exhaust port 234 is an opening which guides the air heated in the periphery of the cylinder 3 to the discharge holes 2b (refer to FIG. 3) of the stationary platen 2. Under the state where the purge cover 20 is connected to the stationary platen 2 as shown in FIG. 3, the exhaust port 234 faces the discharge holes 2b of the stationary platen 2 in the front/back direction (X direction). The inner cover 230 has the communication port 235 in the lower side (Z2 side). The communication port 235 is an opening which communicates with the communication port 217 of the first cover 21.

Each of the right-side plate 232 and the left-side plate 233 of the inner cover 230 has second connection holes 236 at four positions (FIG. 5 shows the second connection holes 236 only of the left-side plate 233). Each of the second connection holes 236 is an opening through which the bolt 241 (to be described below) protrudes. The second connection holes 236 are arranged at positions which are allowed to be engaged to the first connection holes 226 of the outer cover 220 under the state where the outer cover 220 is superposed on the inner cover 230.

As shown in FIG. 6, the outer cover 220 and the inner cover 230 are superposed, and a spacer 244 is interposed between the outer cover 220 and the inner cover 230. The bolt 241 with a washer 242 attached is inserted into the connection hole 226 and the connection hole 236, and fastened with a nut 243, whereby the outer cover 220 and the inner cover 230 are connected. A long nut (not shown) may be used, instead of the spacer 244. In this case, short bolts (one bolt is of a reverse screw) may be inserted respectively from the side of the outer cover 220 and the side of the inner cover 230, and may be fastened with the long nut interposed between the covers.

As shown in FIG. 6, under the state where the outer cover 220 and the inner cover 230 are connected, a predetermined gap t is formed between the outer cover 220 and the inner cover 230. The air heated by the surface of the inner cover 230 passes from the gap t formed between the covers through the vents 225 of the outer cover 220, thereby being discharged to the outside. The second cover 22, under the state where the outer cover 220 and the inner cover 230 are superposed, is installed at the communication port 217 of the first cover 21. The second cover 22 is connected to the outer peripheral part of the communication port 217 with, for example, screws.

In the exhaust unit 5 for injection molding machine according to the present embodiment configured as described above, the air heated in the periphery of the cylinder 3 is introduced from the cylinder cover 10 to the purge cover 20, passes through the first cover 21 of the purge cover 20, and is guided to the second cover 22. The air is partially guided from the second cover 22 to the side of the stationary platen 2, and is introduced to the discharge holes 2b of the stationary platen 2. As shown in FIG. 3, the air introduced to the discharge holes 2b of the stationary platen 2 passes through the inside of the stationary platen 2, and is discharged to the upper side (Z1 side).

The exhaust unit 5 for injection molding machine according to the present embodiment described above produces, for example, the following effects. In the exhaust unit 5 for injection molding machine according to the present embodiment, the purge cover 20 includes the first cover 21 and the second cover 22 covering the upper side (Z1 side), the right side (Y1 side) and the left side (Y2 side), thereby effectively suppressing the scattering to the outside of the molding material leaked out during the purge operation. The air heated in the periphery of the cylinder 3 is guided from the second cover 22 to the side of the stationary platen 2, thereby suppressing the air from staying inside the purge cover 20. Therefore, most of the heat in the heated air is absorbed by the stationary platen 2 having a large heat capacity, and thus the surface of the purge cover 20 is able to be kept low in temperature. Accordingly, the exhaust unit 5 for injection molding machine according to the present embodiment enables the lowering of the temperature of the surface of the purge cover 20, while suppressing the scattering of molding material.

In the exhaust unit 5 for injection molding machine according to the present embodiment, the stationary platen 2 includes the discharge holes 2b which communicate from the back side (X2 side) to the outside (Z1 side). This structure enables the partial discharge of the heated air, guided from the second cover 22 of the purge cover 20 to the stationary platen 2, to the outside through the discharge holes 2b, thereby the temperature of the surface of the purge cover 20 to be kept lower, as compared with a structure without the discharge holes 2b.

In the exhaust unit 5 for injection molding machine according to the present embodiment, the second cover 22 serving as the exhaust passage of the purge cover 20 functions as the roof part which guides the heated air discharged from the side of the cylinder 3 to the side of the stationary platen 2. This structure enables effective introduction of the heated air discharged from the side of the cylinder 3 to the side of the stationary platen 2, without discharging the air to the surface of the purge cover 20.

In the exhaust unit 5 for injection molding machine according to the present embodiment, the second cover 22 serving as the exhaust passage of the purge cover 20 has the tilted plane which is tilted from the side of the cylinder 3 upward while approaching the side of the stationary platen 2. This structure enables effective introduction of the heated air discharged from the side of the cylinder 3 to the side of the stationary platen 2. In the exhaust unit 5 for injection molding machine according to the present embodiment, the second cover 22 (the purge cover 20) has the dual structure in which the outer cover 220 and the inner cover 230 are superposed on each other, and thus the structure enables effective suppression of the scattering to the outside of the molding material leaked out during the purge operation.

In the exhaust unit 5 for injection molding machine according to the present embodiment, the outer cover 220 of the second cover 22 includes the plurality of vents 225 as the heat radiation structure. The outer cover 220 thus enables the discharge the air heated by the surface of the inner cover 230 to the outside through the vents 225. The inner cover 230 does not include a heat radiation structure such as a vent. The inner cover 230 thus enables effective guidance of the most of the air heated in the periphery of the cylinder 3 to the side of the stationary platen 2.

The embodiment according to the present invention has been described so far. The present invention is not limited to the embodiment described above. Various modifications and changes are available, such as the modifications to be described below, and these are also included in the technical scope of the present invention. The effects described in the embodiment have been introduced merely as the most preferable effects produced by the present invention. The effects produced by the present invention are not limited to those described in the embodiment. It is noted that although the embodiment described above and the modifications to be described below may be combined and used as appropriate, the detailed descriptions thereof will be omitted.

Modifications

In the present embodiment, the number of the discharge holes 2b may be one, or may be three or more, and is not limited to two. The stationary platen 2 may be configured without any discharge hole 2b. Such a configuration also enables to keep the temperature of the surface of the purge cover 20 low. In the present embodiment, the second cover 22 functioning as the roof part may be formed in, for example, a shape having a part of a circle, a quadrilateral shape or the like, not limited to a linear tilted plane. That is, the second cover 22 may be formed in any shape, as long as the second cover 22 is able to guide the air discharged from the side of the cylinder 3 to the side of the stationary platen 2.

In the present embodiment, each of the vents 225 of the outer cover 220 may have, for example, an elliptical shape, a quadrangular shape, a triangular shape, a trapezoidal shape or a polygonal shape, not limited to a circular shape. Each of the vents 225 may have a slit shape, not limited to a hole shape. The vents 225 may be arranged regularly as shown in FIG. 5, or may be arranged at random. Moreover, the shapes, sizes, numbers, etc. of the vents 225 of the tilted plate 221, the right side plate 222 and the left-side plate 223 of the outer cover 220 may be identical or may be different. It is noted that the heat radiation structure is not limited to the structure having the plurality of vents 225, and may be of structure partially having a thinner part as a pit.

EXPLANATION OF REFERENCE NUMERALS

1: INJECTION MOLDING MACHINE, 2: STATIONARY PLATEN, 2*b*: DISCHARGE HOLE, 3: CYLINDER, 3*a*: NOZZLE, 4: WATER-COOLING JACKET, 5: EXHAUST UNIT FOR INJECTION MOLDING MACHINE, 10: CYLINDER COVER, 20: PURGE COVER, 21: FIRST COVER, 22: SECOND COVER, 215: NOZZLE THROUGH-HOLE, 220: OUTER COVER, 221: TILTED PLATE, 225: VENT, 230: INNER COVER, 234: EXHAUST PORT

What is claimed is:

1. An exhaust unit for an injection molding machine comprising:
    a purge cover having a nozzle through-hole allowing a nozzle of a cylinder of the injection molding machine to pierce through, an exhaust passage extending higher than the cylinder in an upward direction, and an exhaust port communicating with the exhaust passage; and
    a stationary platen connected to the exhaust port of the purge cover; wherein
    the stationary platen has a discharge hole allowing to discharge, to an outside through the stationary platen, air discharged from the connected exhaust port of the purge cover, and an insertion port into which the nozzle of the cylinder is insertable; and
    the discharge hole of the stationary platen is separate from the insertion port of the stationary platen.

2. The exhaust unit for an injection molding machine according to claim 1, wherein
    the exhaust passage of the purge cover includes a roof part configured to guide air discharged from the cylinder to the stationary platen.

3. The exhaust unit for an injection molding machine according to claim 2, wherein
    the roof part has a tilted plane tilted from the side of the cylinder upward while approaching the side of the stationary platen.

4. The exhaust unit for an injection molding machine according to claim 2, wherein
    the roof part has a dual structure including an outer cover and an inner cover superposed on each other, and the outer cover has a heat radiation structure and the inner cover does not have a heat radiation structure.

* * * * *